United States Patent
Lakerdas et al.

(10) Patent No.: US 6,439,855 B1
(45) Date of Patent: Aug. 27, 2002

(54) DIRECT CURRENT ELECTRIC MOTOR WHICH ELIMINATES OUTER CASE AND PLACES BRUSHES AND CHOKES IN SPACE EFFICIENT LOCATIONS

(75) Inventors: Andrew Lakerdas; Andrew Paul Smith; Martin Volkening, all of London (CA)

(73) Assignee: Siemens Automotive, Inc., Mississauga (CA)

( * ) Notice: Subject to any disclaimer, the term of this patent is extended or adjusted under 35 U.S.C. 154(b) by 11 days.

(21) Appl. No.: 09/781,499

(22) Filed: Feb. 12, 2001

(51) Int. Cl.[7] .................. F04B 19/24; F04B 17/00; H02K 21/26
(52) U.S. Cl. .............. 417/53; 417/352; 417/423.7; 310/154.05
(58) Field of Search ............. 417/53, 352, 423.7; 310/154.05, 154.06, 67 R, 62, 63, 51, 68 R

(56) References Cited

U.S. PATENT DOCUMENTS

| | | | |
|---|---|---|---|
| 271,928 A | 2/1883 | Seeley | |
| 378,892 A | 3/1888 | Loomis | |
| 3,525,007 A | 8/1970 | Baudot | |
| RE31,278 E | 6/1983 | Schmider | |
| 4,536,668 A | 8/1985 | Boyer | |
| 4,663,549 A | * 5/1987 | Suzuki | 310/62 |
| 4,684,839 A | 8/1987 | Fujisaki et al. | |
| 4,894,572 A | 1/1990 | Shiraki | |
| 4,906,884 A | 3/1990 | Teshigawara | |
| RE33,628 E | 7/1991 | Hahn | |
| 5,036,239 A | 7/1991 | Yamaguchi | |
| 5,144,183 A | 9/1992 | Farrenkopf | |
| 5,196,747 A | * 3/1993 | Kress et al. | 310/89 |
| 5,243,247 A | * 9/1993 | Schmidt | 310/68 R |
| 5,245,235 A | 9/1993 | Nagai et al. | |
| 5,412,265 A | 5/1995 | Sickafus | |
| 5,426,338 A | 6/1995 | Leupold | |
| 5,455,474 A | * 10/1995 | Flynn | 310/181 |
| 5,656,880 A | 8/1997 | Clark | |
| RE35,702 E | 12/1997 | Cap et al. | |
| 5,747,908 A | 5/1998 | Saneshige et al. | |
| 5,760,521 A | 6/1998 | Ushiro | |
| 5,793,133 A | * 8/1998 | Shiraki et al. | 310/81 |
| 5,804,905 A | 9/1998 | Knoerzer | |
| 5,942,824 A | 8/1999 | Shioya et al. | |
| 5,942,833 A | 8/1999 | Yamaguchi | |
| 5,945,766 A | 8/1999 | Kim et al. | |
| 6,005,324 A | 12/1999 | Kim | |
| 6,011,337 A | 1/2000 | Lin et al. | |
| 6,114,788 A | 9/2000 | Vuillemin et al. | |
| 6,114,792 A | 9/2000 | Tiemeyer | |

* cited by examiner

Primary Examiner—Timothy S. Thorpe
Assistant Examiner—Michael K. Gray

(57) ABSTRACT

A motor and fan structure 10 includes direct current motor assembly 18 having a stator assembly 20 including a flux plate 22 and permanent magnet structure 24 mounted on the flux plate 22. The flux plate 22 defines one end of the motor assembly and define a magnetic flux path of the motor assembly. The motor assembly also includes a generally cylindrical armature assembly 32 defining another end of the motor assembly. The armature assembly is radially wound with windings 40, and an outermost part of the armature assembly and at least a portion of the windings is exposed to the environment. The structure includes a fan 12 having a generally cylindrical hub 14 receiving and covering the outermost part and the portion of the windings of the armature assembly. The hub 14 has a plurality of blades 16 extending therefrom. Thus, the weight and axial length of the motor assembly can be reduced since no case is required to cover the armature assembly yet the armature assembly is protected by the fan hub.

17 Claims, 3 Drawing Sheets

DIRECT CURRENT ELECTRIC MOTOR WHICH ELIMINATES OUTER CASE AND PLACES BRUSHES AND CHOKES IN SPACE EFFICIENT LOCATIONS

FIELD OF THE INVENTION

This invention relates to permanent magnet direct current electric motors and more particularly to an electric motor having a radially wound armature, space efficient magnets, chokes and brushes, which permit elimination of an outer casing for covering the armature.

BACKGROUND OF THE INVENTION

Conventional permanent magnet direct current electric motors, particularly for automotive applications, contain an axially-wound rotating armature surrounded by a stationary steel structure that acts as a motor case. The case functions to retain and support the permanent magnets, to provide a conduit for lines of magnetic flux, and to provide a cover for the motor to protect internal parts from damage by external forces or influences.

In applications where axial length is restricted, radially-wound armatures are provided. However, in radially-wound armatures, the typical use of a steel case and the conventional location of the brushes and chokes, disadvantageously add to the cost, weight and axial length of the radially-wound motor.

Accordingly, there is a need to provide a permanent magnet direct current electric motor that is radially wound, includes components in gaps between magnets and requires no steel case covering the armature.

SUMMARY OF THE INVENTION

An object of the present invention is to fulfill the need referred to above. In accordance with the principles of the present invention, this objective is obtained by providing a direct current motor assembly including a stator assembly having a flux plate and four permanent magnets mounted on the flux plate in a manner to define a generally circular outline and defining first and second pairs of spaces between adjacent magnets. The flux plate defines one end of the motor assembly and defines a magnetic flux path of the motor assembly. A pair of brushes are provided with each brush being disposed in an associated space of the first pair of spaces. A pair of chokes are provided with each choke being disposed in an associated space of the second pair of spaces.

An armature assembly is disposed adjacent to the stator assembly and defines another end of the motor assembly. The armature assembly is radially wound with wire windings, and an outermost part and at least a portion of the wire windings of the armature assembly are exposed to the environment.

In accordance with another aspect of the invention, a motor and fan structure includes a direct current motor assembly having a stator assembly including a flux plate and permanent magnet structure mounted on the flux plate. The flux plate defines one end of the motor assembly and a magnetic flux path of the motor assembly. The motor assembly also includes a generally cylindrical armature assembly defining another end of the motor assembly. The armature assembly is radially wound with wire windings, and an outermost part of the armature assembly and at least a portion of the wire windings are exposed to the environment.

The structure includes a fan having a generally cylindrical hub receiving and covering the exposed outermost part and the portion of the wire windings of the armature assembly. The hub has a plurality of blades extending therefrom. Thus, the weight and axial length of the motor assembly can be reduced since no case is required to cover the armature assembly yet the armature assembly is protected by the fan hub.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

DETAILED DESCRIPTION OF THE INVENTION

Figure 1:
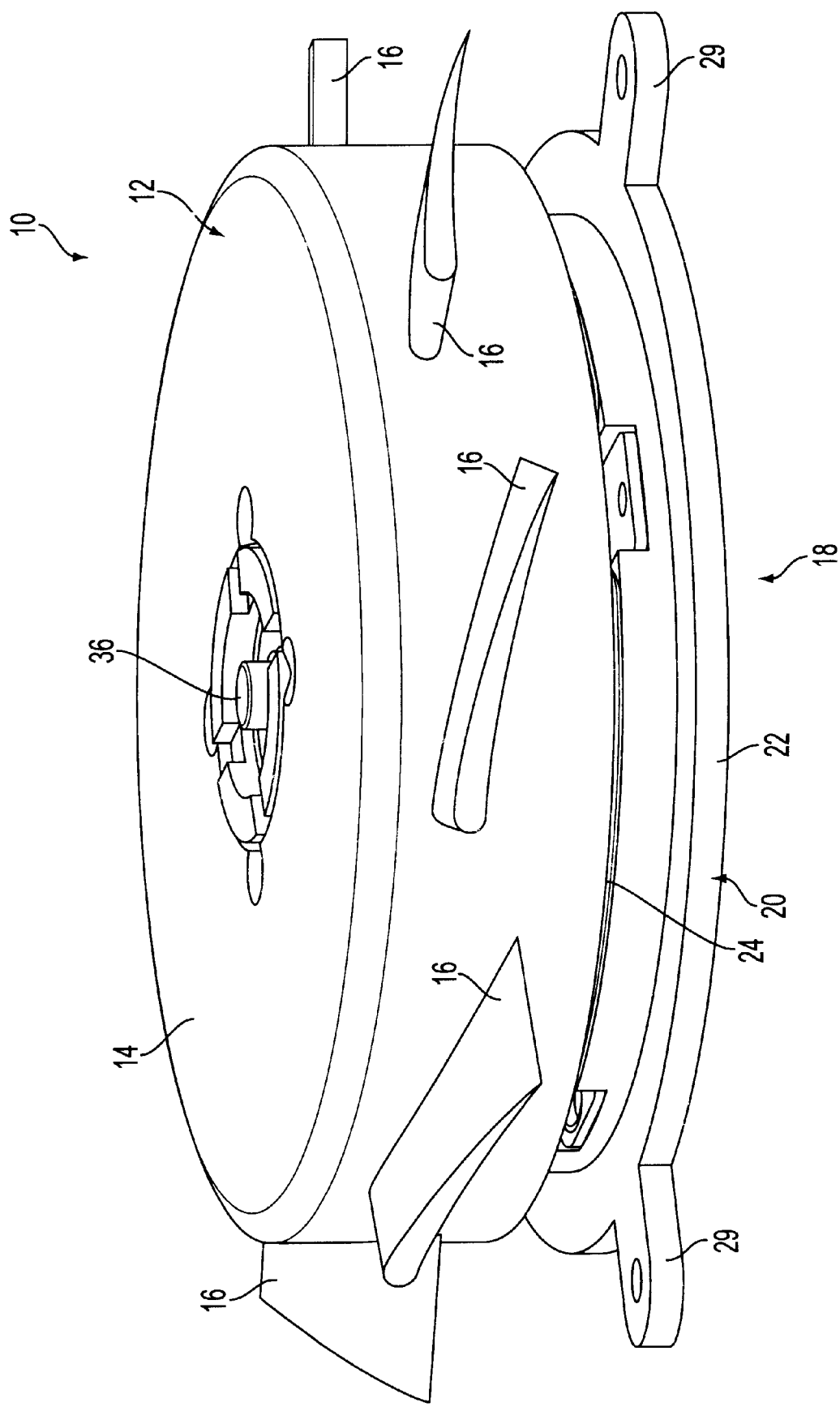
FIG. 1 is a perspective view of a direct current motor assembly received by a fan hub, provided in accordance with the principles of the present invention.

Referring to FIG. 1, a direct current motor and fan structure, provided in accordance with the principles of the present invention, is shown generally indicated at 10. The structure 10 includes a fan, generally indicated at 12, having a generally cylindrical hub 14 and a plurality of blades 16 (portions thereof shown) extending from the hub 14. The hub 14 receives at least a portion of a motor assembly, generally indicated at 18, so as to provide a cover for the portion of the motor assembly 18 to protect the internal parts from damage by external forces or influences. The fan 12 is preferably molded from plastic as an integral member.

Figure 2:
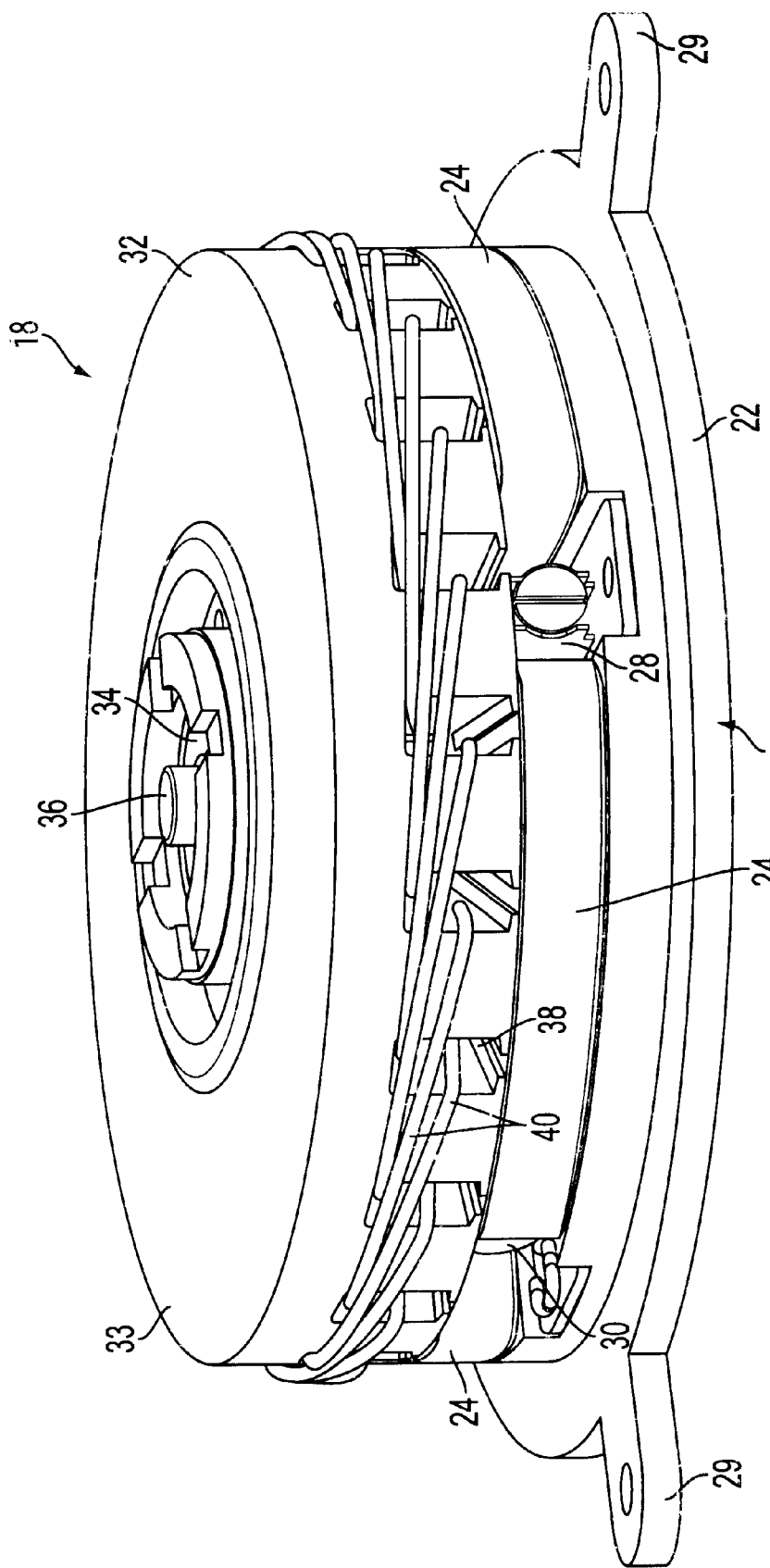
FIG. 2 is a perspective view of the direct current motor assembly of FIG. 1.

With reference to FIG. 2, the motor assembly 18 includes a stator assembly, generally indicated at 20, including a flux plate 22, preferably made of steel or other material capable of carrying lines of magnetic flux between adjacent permanent magnets 24 mounted on the flux plate 22. The flux plate 22 defines one end of the motor assembly 18.

Figure 3:
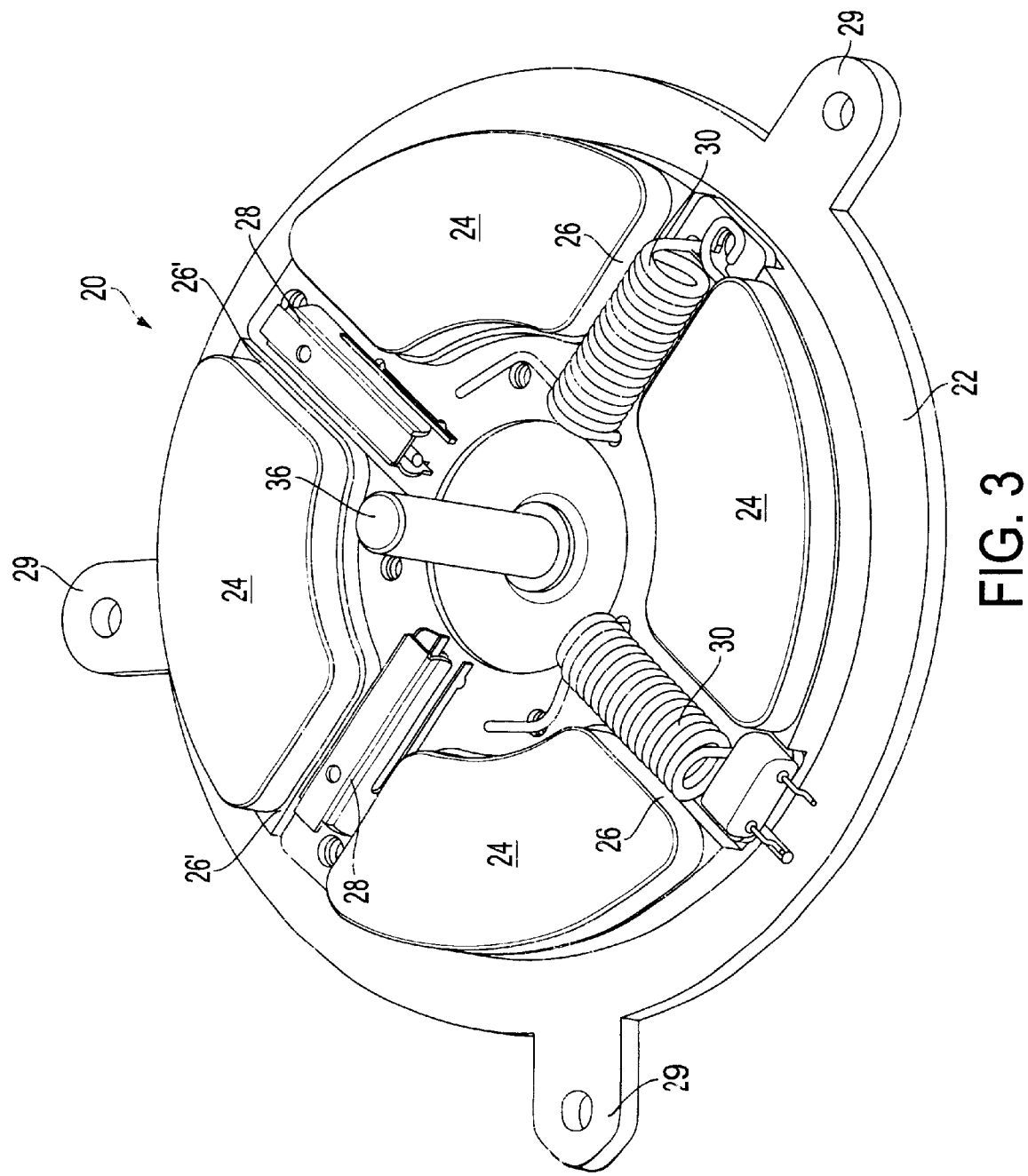
FIG. 3 is a view of the stator assembly of the direct current motor of FIG. 2.

As best shown in FIG. 3, a plurality of permanent magnets 24, four in the illustrated embodiment for a four pole motor, are secured to the flux plate 22. The invention is not limited to a four pole motor as any number of poles can be used in accordance with the invention. The magnets are arranged in a manner to form a generally circular outline and define a first pair of spaces 26 and a second pair of spaces 26' between adjacent magnets 24. A brush 28 is disposed in an associated space of the first pair of spaces 26, and a choke 30 is disposed in an associated space of the second pair of spaces 26'. The flux plate 22 also includes mounting tabs 29 for mounting the motor assembly 10.

With reference to FIG. 2, the motor assembly includes an armature assembly 32 mounted for rotation via bearings 34 on the motor shaft 36. The armature assembly 32 includes a body 33 defined as a single unit and of generally cylindrical form. The body 33 defines the other end of the motor assembly 18 and is preferably made of steel. The body 33 of the armature assembly 32 includes a plurality of radially-extending slots 38 for receiving magnet-wire windings 40.

The radially-wound windings 40 (providing an axial air-gap motor) together with the placement of the bushes 28 and chokes 30 in the magnet spaces 26 significantly reduces the overall length of the motor assembly 18. As shown, the body 33 or outermost part of the armature assembly 32 and at least a portion of the windings 40 are exposed to the environment (e.g., have no covering or case thereabout).

Due to the use of radially-wound wire windings and since the flux plate 22 defines the flux return path at one end of the motor assembly, the need for the conventional, outer concentric steel case, which typically is required, is eliminated. Hence, since the motor assembly 18 requires no outer case covering the armature assembly 32, the cost and weight of the case are eliminated. In addition, as noted above, the internal parts of the motor assembly 18 are environmentally protected once the body 33 and the portion of the windings 40 are received in the hub 14 of the fan 12.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A direct current motor assembly comprising:
    a stator assembly including a flux plate and permanent magnets mounted on the flux plate in a manner to define a generally circular outline and defining first and second pairs of spaces between adjacent-magnets, the flux plate defining one end of the motor assembly and defining a magnetic flux path of the motor assembly,
    a pair of brushes, each brush being disposed in an associated space of said first pair of spaces,
    a pair of chokes, each choke being disposed in an associated space of said second pair of spaces, and
    an armature assembly adjacent to the stator assembly and defining another end of the motor assembly, the armature assembly being radially wound with wire windings, and an outermost part and at least a portion of the wire windings of the armature assembly being exposed to the environment.

2. The motor assembly of claim 1, wherein the flux plate is of generally circular form and is made of steel.

3. The motor assembly of claim 1, wherein the armature assembly includes a unitary main body defining the outermost part, the main body being of generally cylindrical form and including a plurality of radially-extending slots therein for receiving the wire windings.

4. The motor assembly of claim 1, wherein the armature assembly is mounted for rotation about a shaft of the motor assembly.

5. The structure of claim 1, wherein the blades and hub are formed integrally.

6. A motor and fan structure comprising:
    a direct current motor assembly comprising:
        a stator assembly including a flux plate and permanent magnet structure mounted on the flux plate, the flux plate defining one end of the motor assembly and defining a magnetic flux path of the motor assembly, and
        a generally cylindrical armature assembly defining another end of the motor assembly, the armature assembly being radially wound with wire windings, and an outermost part of the armature assembly and at least a portion of the wire windings being exposed to the environment, and
    a fan including a generally cylindrical hub receiving and covering the exposed outermost part and the portion of the windings of the armature assembly, the hub having a plurality of blades extending therefrom.

7. The structure of claim 6, wherein the magnets are arranged to define a generally circular outline and defining first and second pairs of spaces between adjacent magnets, the motor assembly including:
    a pair of brushes, each brush being disposed in an associated space of said first pair of spaces, and
    a pair of chokes, each choke being disposed in an associated space of said second pair of spaces.

8. The structure of claim 6, wherein the flux plate is of generally circular form and is made of steel.

9. The structure of claim 6, wherein the armature assembly includes a unitary main body defining the outermost part, the main body being of generally cylindrical form and including a plurality of radially-extending slots therein for receiving the wire windings.

10. The structure of claim 6, wherein the armature assembly is mounted for rotation about a shaft of the motor assembly.

11. A method of providing a fan and motor structure, the method including:
    providing of direct current motor assembly comprising:
        a stator assembly including a flux plate and permanent magnet structure mounted on the flux plate, the flux plate defining one end of the motor assembly and defining a magnetic flux path of the motor assembly, and
        a generally cylindrical armature assembly defining another end of the motor assembly, the armature assembly being radially wound wire with windings, and an outermost part and at least a portion of the wire windings of the armature assembly being exposed to the environment,
    providing a fan including a generally cylindrical hub sized to receive the outermost part and the portion of the windings of the armature assembly, the hub having a plurality of blades extending therefrom, and
    using the fan as a cover by inserting the exposed outermost part of the armature assembly and portion of the wire windings into the hub so that the hub covers the outermost part and portion of the windings, thereby preventing exposure thereof to the environment.

12. The method of claim 11, wherein the step of providing the motor assembly includes providing the flux plate in generally circular form and comprised of steel.

13. The method of claim 11, wherein the step of providing motor assembly includes providing the armature assembly to include a unitary main body defining the outermost part, the main body being of generally cylindrical form and including a plurality of radially-extending slots therein for receiving the wire windings.

14. The method of claim 11, wherein the step of providing the motor assembly includes providing the magnets to define a generally circular outline and to define first and second pairs of spaces between adjacent magnets, the method further including:
    placing a pair of brushes into the first pair of spaces by placing each brush in an associated space of said first pair of spaces, and
    placing a pair of chokes into the second pair of spaces by placing each choke in an associated space of said second pair of spaces.

15. A method of assembling a direct current motor including:

providing a stator assembly including a flux plate and four permanent magnets mounted on the flux plate in a manner to define a generally circular outline and defining first and second pairs of spaces between adjacent magnets, the flux plate defining one end of the motor assembly and defining a magnetic flux path of the motor assembly, placing a pair of brushes into the first pair of spaces by placing each brush in an associated space of said first pair of spaces, placing a pair of chokes into the second pair of spaces by placing each choke in an associated space of said second pair of spaces, and providing an armature assembly adjacent to the stator assembly to define another end of the motor assembly, the armature assembly being radially wound with windings, with an outermost part and at least a portion of the windings of the armature assembly being exposed to the environment.

16. The method of claim 15, wherein the step of providing the stator assembly includes providing the flux plate in generally circular form and made of steel.

17. The method of claim 15, wherein the step of providing the armature assembly includes providing a unitary main body defining the outermost part, the main body being of generally cylindrical form and including a plurality of radially-extending slots therein for receiving the wire windings.

* * * * *